Oct. 31, 1939.   W. F. POTTS   2,178,288
RAKING APPARATUS
Filed April 7, 1938   2 Sheets-Sheet 1
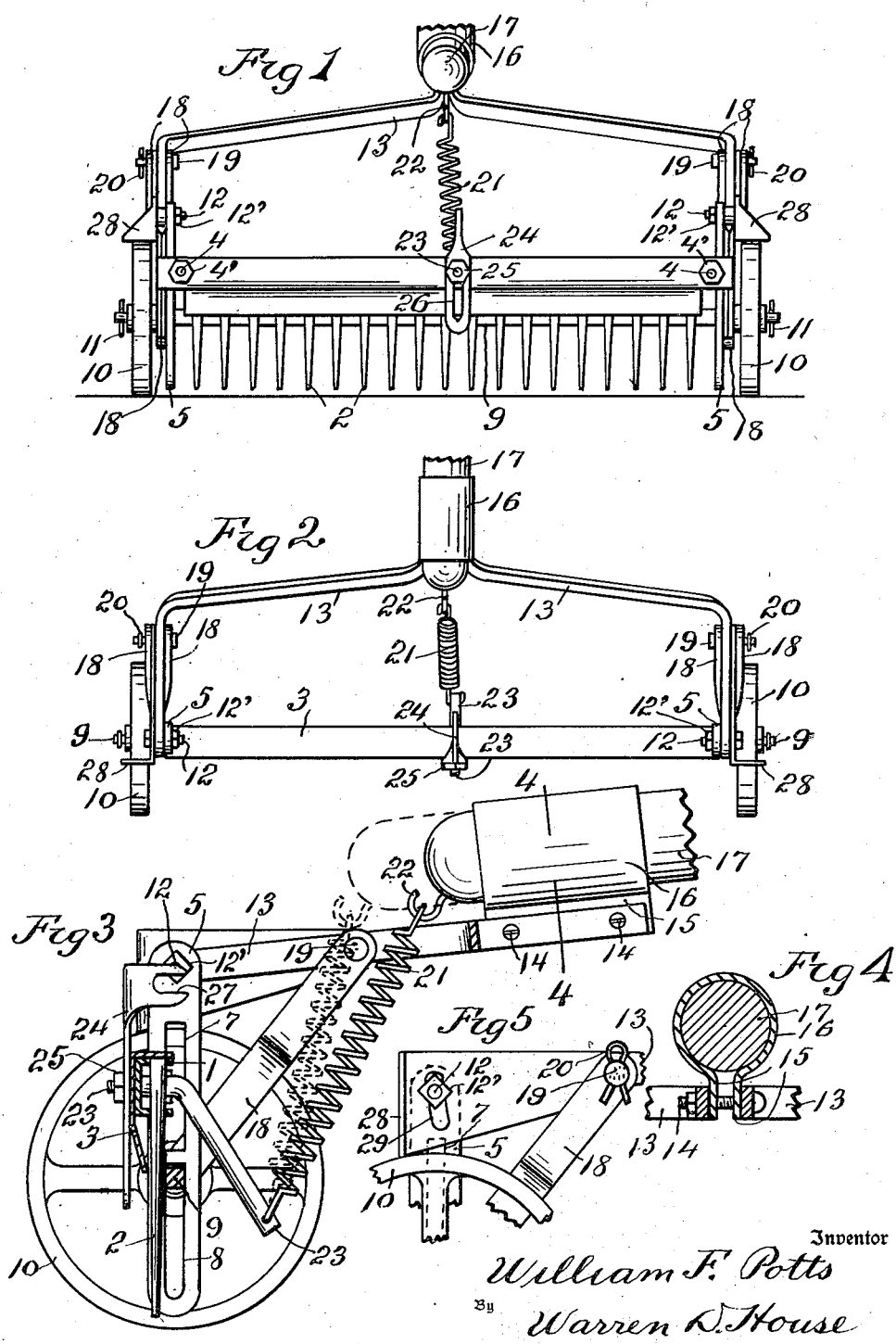
Inventor
William F. Potts
By Warren D. House
His Attorney Oct. 31, 1939. W. F. POTTS 2,178,288
RAKING APPARATUS
Filed April 7, 1938 2 Sheets-Sheet 2
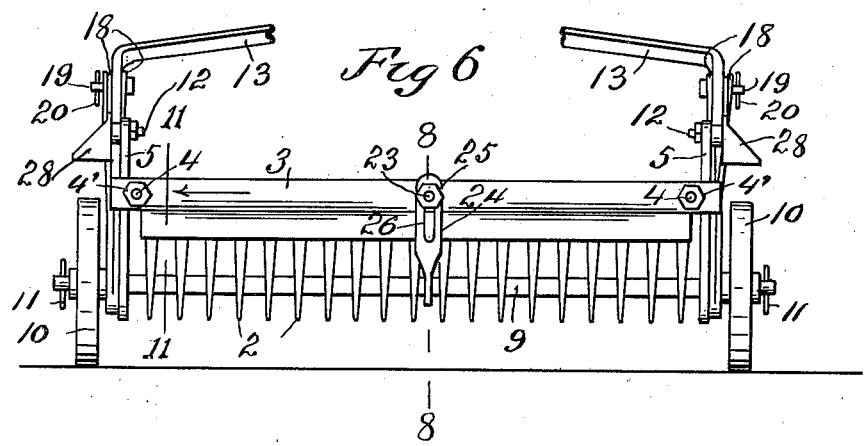
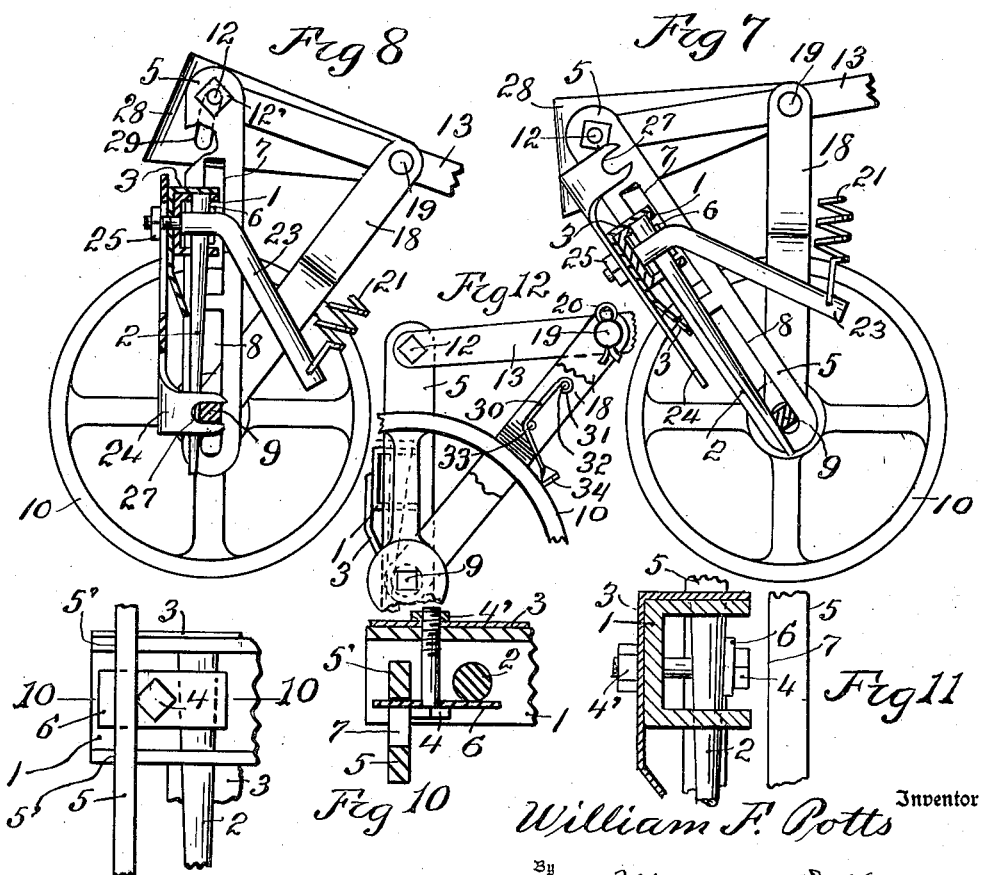
Inventor
William F. Potts
By Warren D. House
His Attorney Patented Oct. 31, 1939

2,178,288

UNITED STATES PATENT OFFICE 2,178,288

RAKING APPARATUS

William F. Potts, Kansas City, Mo.

Application April 7, 1938, Serial No. 200,670

8 Claims. (Cl. 55—146)

My invention relates to improvements in raking apparatus.

It relates particularly to a wheeled rake having a rake head having novel means for lifting the rake head and stripping therefrom material gathered by the teeth, when the handle pushes the rake ahead.

One of the objects of my invention is the provision of novel means for supporting the rake head, novel means for stripping the material from the rake teeth, and novel means for attaching the rake head to the handle.

A further object of my invention is the provision of novel means by which the head of the rake can be adjusted to different operating heights from the ground, so as to permit the teeth to be disposed at all times above the ground, or in positions in which the teeth may enter the ground to different distances.

Another object of my invention is the provision of novel means by which teeth may be removed and replaced readily, and by which they will be firmly held in operative position.

Still another object of my invention is the provision of novel means for attaching the rake head to the handle.

Another object of my invention is the provision of novel means for scraping the peripheries of the carrying wheels.

Still another object of my invention is the provision of a raking apparatus of the kind described which is simple, strong, durable, not likely to get out of order, which can readily be adjusted from a raking to a digging or harrowing position, and which is easy to operate and efficient in its operation.

The novel features of my invention are hereinafter fully described and claimed.

Referring to the drawings which illustrate the preferred embodiment of my invention and some modifications thereof, Fig. 1 is a front elevation of my improved raking apparatus, shown in the raking position and the handle partly broken away.

Fig. 2 is a plan view of what is shown in Fig. 1.

Fig. 3 is an enlarged cross section, showing the rake head and teeth in raking position, with the teeth disposed slightly above the ground.

Fig. 4 is a section on the line 4—4 of Fig. 3.

Fig. 5 is an outside elevation of a part of the mechanism, showing one of the wheel scrapers of Figs. 1 to 3 in operative engagement with the adjacent wheel.

Fig. 6 is a front elevation, parts being broken away, showing the head locking member engaged with the axle stripping member, thereby holding the rake head elevated.

Fig. 7 is a cross section, enlarged, with the rake head inclined and the stripping member, or axle, having operated to strip material from the teeth.

Fig. 8 is an enlarged section on the line 8—8 of Fig. 6, showing the locking member holding the rake head elevated.

Fig. 9 is a rear elevation, enlarged, of an end portion of the head, showing how the channel member is held clamped to one of the slotted end members of the head.

Fig. 10 is a section on the line 10—10 of Fig. 9.

Fig. 11 is a fragmental section of what is shown in Fig. 9.

Fig. 12 is a fragmental side elevation of some of the parts, showing a modified form of scraper engaging the periphery of one of the carrying wheels.

Similar characters of reference designate similar parts in the different views.

The rake head is not of usual construction, but comprises the following described parts.

A transverse horizontal channel member 1 has its flanges disposed one above the other and extending rearwardly, each flange having a longitudinal series of holes registering with the holes in the other flange, the holes on the upper flange being larger than those in the lower flange, and the holes having diameters such that the downwardly tapered rake teeth 2 will tightly fit in the holes, with their upper ends flush with the upper side of the upper flange.

The teeth 2 are separately removable, and are normally held in the flanges by the horizontal flange of an angular angle bar 3, the downwardly extending flange of which is clamped to the front side of the channel bar 1 by two bolts 4, Figs. 1, 3 and 7 to 11. The latter flange extends rearwardly under the channel member 1 and bears against the front sides of the teeth 2, thus holding them firmly. Nuts 4' on the bolts 4 bear against the angle bar 3.

The rake head has two upwardly extending end members 5, the forward edges of which are slidably fitted in slots in the rear edges of the flanges of the channel bar respectively adjacent to the ends of the latter, whereby the channel bar 1 and teeth 2 may be upwardly and downwardly adjusted, so as to have the teeth, when in raking position, at different distances from the ground.

For releasably clamping the channel member 1 in the position to which it may be adjusted on the end members 5, there are provided two clamping plates 6, Figs. 9, 10 and 11, through which respectively extend the bolts 4, and which bear against the rear sides of the end teeth 2 respectively, and against the end members 5 in the upper longitudinal slots 7 provided respectively in the members 5.

The end members 5 of the rake head are provided each below the slot 7 with a lower longitudinal slot 8 through which extends and is slidable a horizontal transverse stripping member 9, which also serves as an axle, the ends of which are mounted in and supported by two carrying wheels 10 adapted for travel on the ground. Removable cotter pins 11 respectively fasten the wheels 10 on the axle 9, whereby the wheels 10 may be easily removed, when it is desired, as will be hereinafter explained, to use the teeth 2 for harrowing instead of raking.

Pivoted respectively by bolts 12 to the upper end portions of the end members 5 of the rake head, are two rearwardly extending members comprising bars 13, the rear end portions of which are clamped by bolts 14 to the outer sides of two downwardly extending longitudinal edge portions or flanges 15 of a longitudinally divided sleeve 16, which is rigidly clamped upon the front end portion of an ordinary rearwardly extending handle 17.

Each member 13, between the bolt 12 and the sleeve 16, is embraced by the upper end portions of a pair of links 18 to which it is pivoted by a bolt 19. The lower ends of the links 18 of each pair are pivoted to the axle stripping member 9 at the inner side of the adjacent wheel 10. Cotter pins 20 respectively hold the bolts 19 in operative positions.

For partially balancing the weight of the rake head and parts attached to it, there is provided a coil spring 21, the rear end of which is fastened to a hook 22 in the front end of the handle 17. The other end of the spring 21 is attached to the lower rear end of a bolt 23 that extends upwardly forwardly, and has a shouldered front threaded end portion extending forwardly through the web of the channel member 1, the angle member 3 and a locking member 24, which bears against the front side of the angle member 3. A nut 25 on the front end of the bolt 23 holds the latter in operative position. The tension of the spring 21 normally tends to lift the rake head. By adjusting the handle 17 in the clamping sleeve 16, between the positions shown respectively in solid and dotted lines in Fig. 3, the tension of the spring 21 may be varied.

The locking member 24 has a longitudinal slot 26, which, when the nut 25 is loosened, permits the locking member 24 to be swung from the inoperative upper position, shown in Figs. 2 and 3, to the position shown in Figs. 6 and 8, in which position a notch 27 in the lower end of the locking member 24 is adapted to receive the axle stripping member 9, when the rake head is lifted, thereby, when the nut 25 is tightened, holding the rake head and the rake teeth raised from the ground, and projecting below the stripping member 9 a distance depending upon how high above the stripping member 9, the rake head is adjusted on the members 5. With the rake head 1 adjusted to the position desired, and with the locking member lockingly engaged with the stripping member or axle 9, only the portions of the teeth which are below the axle or stripping member 9 will operate for raking, and the teeth will not be stripped of the material raked.

Upon removing the wheels 10 from the axle member 9, the apparatus may then be used to have the teeth 2 harrow the ground.

For raking and having the axle 9 operate as a stripping member, the wheels 10 are placed on the axle 9 and the cotter pins 11 replaced. The locking member 24 is then readjusted to the inoperative position shown in Figs. 1 and 3. The handle 17 is then drawn rearwardly, thus, through the sleeve 16, members 13 and end members 5, swinging the rake head to the position shown in Figs. 1 and 3, and lowering the teeth 2 to the raking position in which they will pull rearwardly the raked material.

Upon pushing the handle 17 forwardly, the same elements, with the assistance of the coil spring 21, and the resistance offered to the forward movement of the wheels by the grass on the ground, will swing the head to the position shown in Fig. 7 with the axle stripping member 9 at the lower end of the slots 8 in the end members 5. In passing to such position, the stripping axle member 9 will strip the material gathered upon the teeth 2.

Upon again pulling back the handle 17, the rake head and teeth 2 will again at once resume the raking lowered position, shown in Figs. 1 and 3, thus completing the cycle.

For scraping mud and dirt from the wheels 10, to prevent the teeth 2 being held higher from the ground than they should be, there is provided, as shown in Figs. 1 to 8, two sheet metal scrapers 28 respectively pivoted to the bolts 19 and having their other ends laterally extending, with their lower edges resting on the peripheries of the wheels 10. The bolts 12 respectively extend through slots 29 in the scrapers 28, to limit the swinging of the latter. The bolts 12 are shouldered and provided with nuts 12'. The scrapers 28 rest on the wheels 10 when the parts are in the lower raking positions, as in Figs. 1 and 3.

In Fig. 12 is shown a wheel scraper of modified form, in which a flat spring plate 30 is disposed edgewise between each pair of links 18. One end of the plate 30 has an eye 31 through which extends an anchoring pin 32 mounted in the pair of links 18. The plate 30 extends toward the adjacent wheel 10 to and past a pin 33 carried by the pair of links 18, and has at its rear end a laterally outwardly extending portion 34 disposed edgewise on the periphery of the adjacent wheel 10. The plate 30 is sprung into this position, and its tension holds it tightly against the wheel 10 at all times.

The scrapers 28 rest by gravity on the wheels 10, and the slots 29 in the scrapers 28 permit the latter to lift up and not serve to exert a braking pressure on the wheels, when crowded with mud or weeds. The spring plate scraper 30 will not accumulate enough material to interfere with easy running of the wheels.

By simply reciprocating the rake handle 17, the grass may be raked, and the material gathered on the teeth stripped therefrom by the axle stripping member 9 on each forward stroke. By having the stripping member 9 disposed at the rear of the rake teeth 2, raked material is prevented from piling up on the teeth above the stripping member, which would not be prevented, were the stripping member at the front side of the teeth, as trial has proven.

Many other modifications may be made, within the scope of the appended claims, without departing from the spirit of my invention.

What I claim is:

1. In a raking apparatus, a rake head, teeth carried thereby, a handle, a member pivoted to said head, means attaching said member to said handle, a stripping member extending transversely across and closely adjacent to said teeth and relatively to which said head is upwardly and downwardly movable, means independent of said head and said teeth adapted for travel on the ground supporting said stripping member, and a link connected to said stripping member and pivoted to said pivoted member.

2. In a raking apparatus, a transverse stripping member, means adapted for travel on the ground supporting said stripping member, a rake head movable upwardly and downwardly and having sliding engagement with said stripping member, teeth carried by said head closely adjacent and transverse to said stripping member, a handle, a member pivoted to said head, means attaching said pivoted member to said handle, and a link connected to said stripping member and pivoted to said pivoted member, said means supporting said stripping member being independent of said head and said teeth.

3. In a raking apparatus, carrying wheels, a stripping member mounted on and serving as an axle for said wheels, a rake head upwardly and downwardly movable relatively to said stripping member, teeth carried by said head closely adjacent and transverse to said stripping member, a handle, a member pivoted to said head, means attaching said pivoted member to said handle, and a link connected to said stripping member and pivoted to said pivoted member.

4. In a raking apparatus, a stripping member, means adapted for travel on the ground supporting said stripping member, a rake head having a member transverse to said stripping member, said transverse member having a slot through which said stripping member extends and has sliding engagement with said slotted transverse member, teeth carried by said head closely adjacent and transverse to said stripping member, a handle, a member pivoted to said slotted member, means attaching said pivoted member to said handle, and a link connected to said stripping member and pivoted to said pivoted member.

5. In a raking apparatus, a stripping member, means adapted for travel on the ground supporting said stripping member, a rake head having a member transverse to and having sliding engagement with said stripping member, said head having tooth supporting means adjustable on said slidable member toward and from said stripping member, teeth carried by said tooth supporting means closely adjacent and transverse to said stripping member, a handle, a member pivoted to said slidable member, means attaching said pivoted member to said handle, and a link connected to said stripping member and pivoted to said pivoted member.

6. In a raking apparatus, a stripping member, two carrying wheels supporting said stripping member, a rake head having two members transverse to and having sliding engagement with said stripping member, teeth carried by said head and movable therewith and transverse and closely adjacent to said stripping member, a handle, two members respectively pivoted to said slidable members, means attaching said two pivoted members to said handle, and two links connected to said stripping member and respectively pivoted to said two pivoted members.

7. In a raking apparatus, a stripping member, two carrying wheels supporting said stripping member, a rake head having two members transverse to and having sliding engagement with said stripping member, said head having tooth supporting means adjustable on said slidable members toward and from said stripping member, teeth carried by said tooth supporting means and movable therewith transverse and closely adjacent to said stripping member, a handle, two members pivoted respectively to said two slidable members, means attaching said pivoted members to said handle, and a link connected to said stripping member and pivoted to one of said pivoted members.

8. In a raking apparatus, a transverse stripping member, means adapted for travel on the ground supporting said stripping member, a rake head having tooth supporting means and having a member provided with two alined slots, disposed one above the other, said stripping member being disposed in the lower one of said slots and having sliding engagement with said slotted member, teeth carried by said tooth supporting means transversely adjacent to said stripping member, said tooth supporting means with said teeth being upwardly and downwardly adjustable, and means adjustable in the upper one of said slots for fastening said tooth supporting means in different positions to which said tooth supporting means is adjusted.

WILLIAM F. POTTS.